Figure 1:
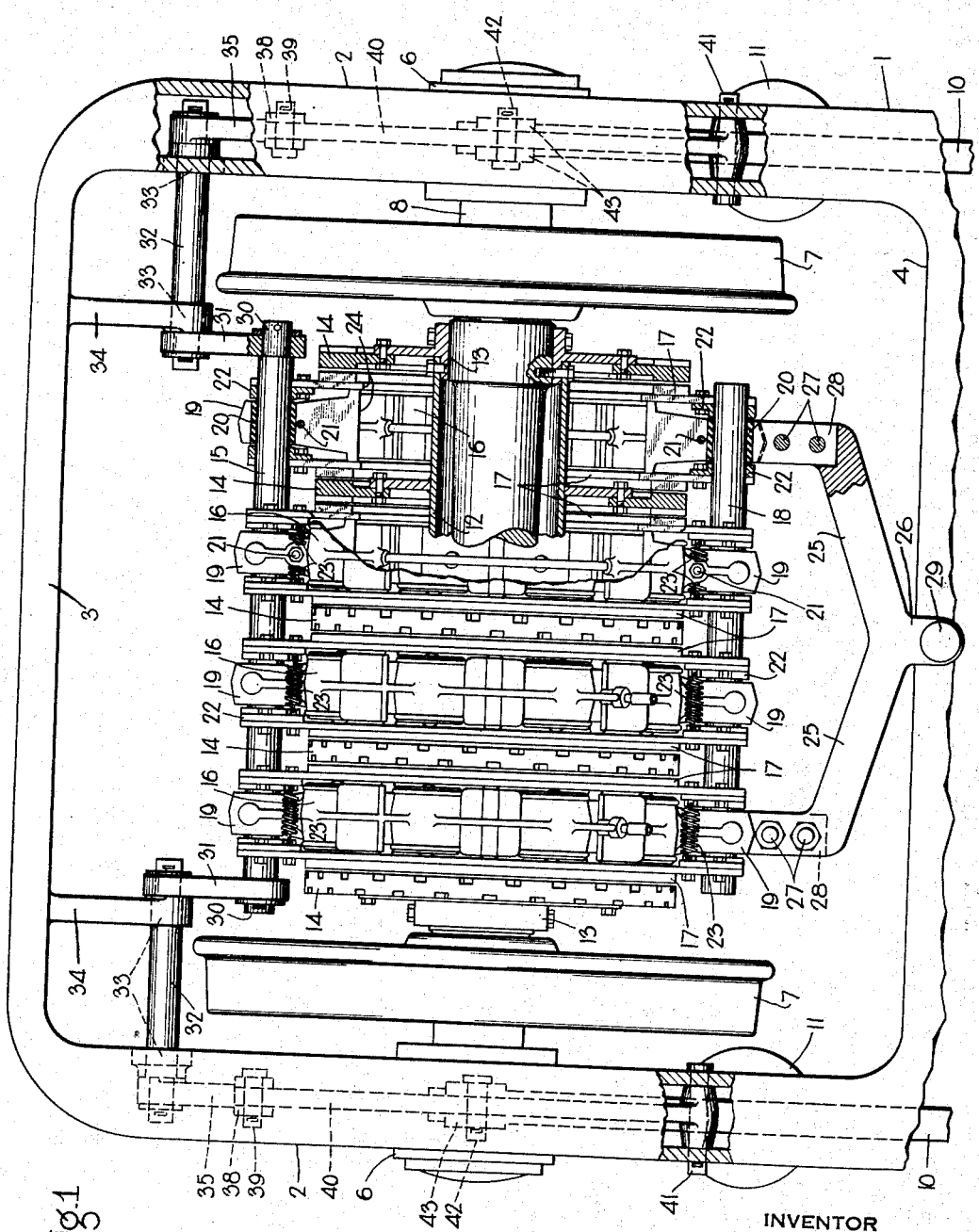

Dec. 23, 1941.   C. C. FARMER   2,267,560
BRAKE MECHANISM
Filed Jan. 31, 1940   2 Sheets-Sheet 1

INVENTOR
CLYDE C. FARMER
BY
ATTORNEY

Dec. 23, 1941.   C. C. FARMER   2,267,560
BRAKE MECHANISM
Filed Jan. 31, 1940   2 Sheets-Sheet 2

INVENTOR
CLYDE C. FARMER
BY
ATTORNEY

Patented Dec. 23, 1941

2,267,560

UNITED STATES PATENT OFFICE 2,267,560

BRAKE MECHANISM

Clyde C. Farmer, Pittsburgh, Pa., assignor to The Westinghouse Air Brake Company, Wilmerding, Pa., a corporation of Pennsylvania Application January 31, 1940, Serial No. 316,569

10 Claims. (Cl. 188—190)

This invention relates to brake mechanisms and more particularly to the type having rotatable and non-rotatable friction brake elements adapted to be associated with a wheel and axle assembly of a railway vehicle truck for effecting braking thereof.

In the application of the above type of brake mechanism to railway vehicle trucks it is customary to rigidly secure the annular rotatable friction elements to be braked to the wheel and axle assembly of the truck in coaxial relation and for rotation therewith, and, as will be apparent, it is desired that the non-rotatable brake elements be in coaxial relation with the rotatable elements at the time the elements are forced into frictional braking interengagement.

Wheel and axle assemblies of railway vehicle trucks usually vibrate severely due to pounding against the rails at rail joints, cross-overs and the like and in order to minimize wear and damage to bearings, pins and other non-rotatable parts of the above type of brake mechanism due to such vibration it has heretofore been proposed to resiliently support these parts of the brake mechanism.

For instance, in Patent No. 2,218,614 issued to Joseph C. McCune on October 22, 1940, there is disclosed a disk brake mechanism all parts of which are carried directly by the wheel and axle assembly, but resilient bushings are arranged in the mechanism to cushion the non-rotatable parts thereof against shocks to which the wheel and axle assembly is subjected.

A possibly greater degree of resilient support for the non-rotatable parts of brake mechanisms of this type may be obtained by supporting same from the resiliently supported frame of a vehicle truck, as disclosed for instance, in my Patent 2,174,398, issued September 26, 1939. An essential part of the mechanism disclosed in this patent however is the provision of a centralizing arrangement adapted to operate at the time the brakes on the vehicle are applied to move the non-rotatable friction braking parts of the brake mechanism from the position in which they are normally carried by the truck frame relative to said frame into coaxial relation with the rotatable parts of the mechanism which are rigidly secured to the wheel and axle assembly for rotation therewith.

In the structure disclosed in the above referred to McCune patent the annular brake elements encircling the wheel and axle assembly are secured for movement therewith at all times and it will therefore be apparent that the inside diameters of said brake elements need be substantially no greater than that of the encircled parts of said assembly, while the outside diameter of the elements need only be sufficiently great to provide a desired area of friction surface. In other words, with such an arrangement the size of the annular brake elements is independent of vertical movement of the truck frame with respect to the wheel and axle assembly and can thus be maintained at a minimum or at whatever size is desired.

However, in the structure disclosed in my patent above mentioned the inside diameter of the non-rotatable brake elements need be sufficiently great to allow said elements to move with the truck frame between its empty and full load positions relative to the wheel and axle assembly without engaging said assembly, when the brakes on the truck are released. It will therefore be apparent that the diameter of these non-rotatable elements need be greater than in the structure disclosed in the McCune patent to provide the same degree of braking surface. This however is not particularly objectionable with usual truck structures since the movement of the truck frame between the empty and full load positions is not so great as to require brake elements of excessive size.

In certain modern truck constructions the supporting springs for the truck frame are, however, for the sake of easy riding, designed to permit greater vertical movement of the truck frame relative to the wheel and axle assembly than heretofore provided. It will therefore be apparent that in a brake mechanism such as disclosed in my above referred patent, this new spring arrangement would, due to the greater deflection thereof, require brake elements of greater inside diameter and consequently also outside diameter, than necessary for use with trucks having less spring deflection, to avoid fouling of the brake elements on the wheel and axle assembly in the extreme verical positions of the truck frame, and one object of the present invention is to provide an improved resilient supporting arrangement for the non-rotatable parts of a brake mechanism of the type disclosed in my above referred to patent, which will permit the use of rotatable and non-rotatable brake elements of substantially no greater diameter than required in a structure of the type disclosed in the above referred to McCune patent, regardless of the degree of vertical movement of the truck frame with respect to the wheel and axle assembly.

Another object of the invention is the provision of an improved arrangement for supporting the non-rotatable parts of a brake mechanism such as above described from a resiliently mounted truck frame and which is operative upon vertical movement of said frame with respect to the wheel and axle assembly to maintain said non-rotatable brake elements in substantial coaxial relation with the rotatable brake elements which are rigidly secured to the wheel and axle assembly for rotation therewith.

More specifically, the improvements consist in the provision of means connected to both the spring supported truck frame and to an unsprung part of the truck for carrying the non-rotatable brake parts of the brake mechanism and which is adapted to operate to cushion said parts against shock incident to vibration of the unsprung parts of the brake mechanism and which is also adapted to operate upon vertical movement of the truck frame relative to the wheel and axle assembly to maintain the non-rotatable brake elements in substantial coaxial relation with the rotatable brake elements which are rigidly secured in such relation to the wheel and axle assembly. These improvements thus provide substantially the same degree of resilient support for the non-rotatable parts of the brake mechanism as obtained in the structure disclosed in my aforementioned patent; however, the arrangement is simpler in construction in that no means are required for centralizing the non-rotatable brake elements with the rotatable brake elements at the time an application of the brakes on the truck is effected, and furthermore, the brake elements required for use in this improved structure need be no greater in diameter than in the brake mechanism disclosed in the above mentioned McCune patent.

Other objects and advantges will be apparent from the above more detailed description of the invention.

Figure 2:
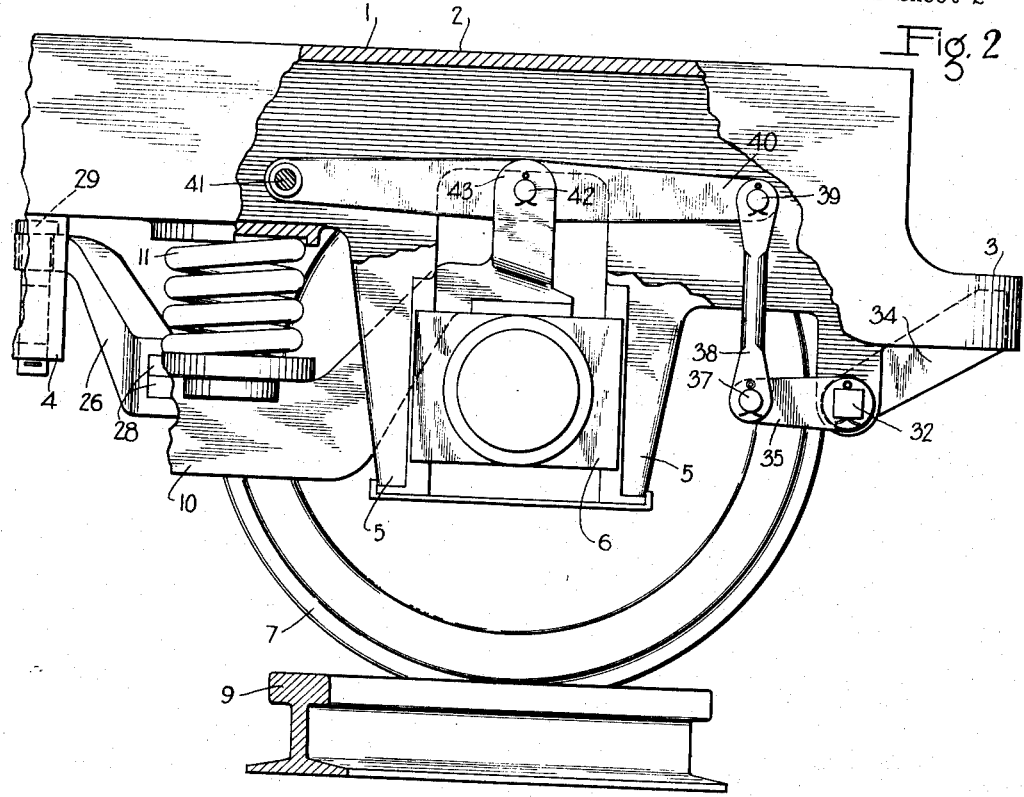
Figure 3:
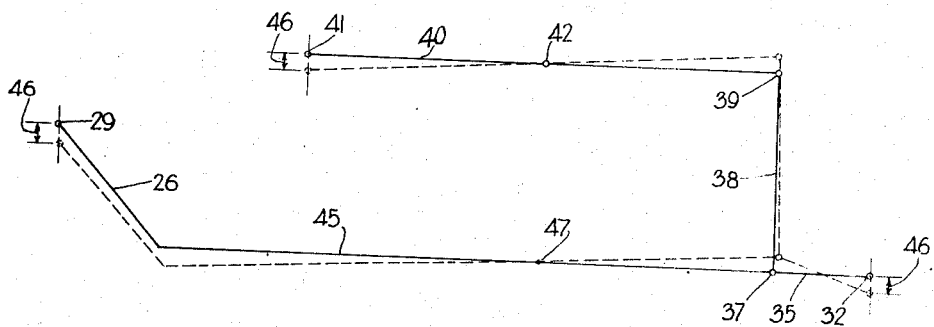

In the accompanying drawings, Fig. 1 is a plan view, partly in section, of a portion of one end of a railway vehicle truck embodying the invention; Fig. 2 is an end view of the vehicle truck shown in Fig. 1, as viewed from the right, with portions broken away to clearly show certain parts of the invention; and Fig. 3 is a line diagram which illustrates the operation of the invention.

Description

As shown in Figs. 1 and 2, the invention is embodied in a railway vehicle truck comprising a truck frame 1 having a pair of inverted channel shaped side members 2 connected in the usual spaced relation by a transversely extending end member 3 and transom 4. Each of the side members 2 is provided with the usual depending pedestal legs 5 when straddle and are slidably mounted in suitable guides provided in the opposite sides of a journal box 6. The journal boxes 6 at the opposite sides of the truck are disposed adjacent the outer faces of truck wheels 7 which are mounted on an axle 8 in the usual spaced relation for rolling on rails 9. The wheels 7 are secured on the axle 8 in any desired manner so that the axle is rotatable with the wheels.

At either side of the truck and directly under the side frames 2 there is provided the usual longitudinal extending equalizer bar 10 the opposite ends of which rest on the journal boxes at that side of the truck. Springs 11 are interposed between the equalizer bars 10 and side members 2 of the truck frame for resiliently supporting said frame from the wheel and axle assembly. A more detailed showing and description of the vehicle truck it not deemed necessary to a clear understanding of the present invention.

Located between the wheels 7 and encircling axle 8 is a brake mechanism which, for the purpose of illustrating one use of the invention, may be of the general type disclosed in the McCune patent hereinbefore referred to.

Briefly, this brake mechanism comprises a tube 12 encircling a portion of axle 8 between wheels 7 and secured through the medium of sleeves 13 at the opposite ends of the tube to the axle 8 for rotation therewith and thereby with the wheels 7. An annular rotatable braking disk 14 is secured to each of the sleeves 13 for rotation with the vehicle wheels 7 and interposed between the two disks 14 are a plurality of like disks 14 encircling and secured to the tube 12 also for rotation with the wheels 7. The several braking disks are arranged in coaxial relation with the wheels 7 and are equally spaced from each other and are provided on their adjacent radial faces with friction braking surfaces.

Encircling the axle 8 and tube 12 between each adjacent pair of rotatable braking disks 14 is an annular brake cylinder device 16 and between each of the opposite faces of said device and the adjacent rotatable brake element 14 is an annular non-rotatable brake element 17 provided with a radial face for frictional braking engagement with the face on the adjacent rotatable brake element 14.

At each of the opposite sides of the axle 8 and slightly beyond the brake cylinder devices 16 there is provided a support bar extending parallel to the axis of the axle 8, the two support bars being indicated by the reference numerals 15 and 18. Each of the brake cylinder devices 16 is provided at each of the opposite sides of axle 8 with an outwardly extending support portion 19; said device being formed in two semi-circular sections joined at a line bisecting the support portions. Through each of the support portions 19 there is provided a bore which is lined with a resilient bushing 20, made of rubber or the like. The support bars 15 and 18 at opposite sides of the axle 8 extend through these bushings and the two parts of the brake cylinder devices are rigidly clamped together and through the medium of said bushings to said support bars by means of bolts 21 extending through the engaging parts of the support portions 19. The brake cylinder devices are thus supported by the bars 15 and 18 and are mounted thereon in positions midway between the rotatable brake elements 14 at either side thereof.

Each of the non-rotatable brake elements 17 is also made in two semi-circular sections arranged in abutting relation and secured at opposite sides of the axle 8 to sleeves 22 which are slidably mounted on the support bars 15 and 18. The two non-rotatable brake elements 17 at the opposite sides of each brake cylinder device are connected together at both sides of axle 8 by release springs 23 provided for moving said elements out of contact and away from the adjacent rotatable brake elements to their brake release positions in which they are shown in the drawings.

In each of the annular brake cylinder devices 16 there are provided a plurality of brake cylinder pistons (not shown) some of which are adapted to be operated by fluid under pressure for moving the non-rotatable brake element at one side of the brake cylinder device into frictional braking engagement with the adjacent rotatable brake element, while others are provided which are adapted to be operated by fluid under pressure to move the non-rotatable brake element at the opposite side of the brake cylinder device into frictional braking engagement with the adjacent rotatable brake element.

The release springs 23 are adapted to act upon the release of fluid under pressure from the several brake cylinder devices to move the non-rotatable brake elements out of braking engagement with the respective rotatable brake elements.

A more detailed description of the construction of the brake cylinder devices and the operation thereof to control the braking of the truck wheels 7 through the medium of the brake elements 14 and 17 and tube 12 is not pertinent to the present invention and will therefore be omitted.

From the above description it should be noted that the several rotatable brake elements 14 are supported through the medium of tube 12 and axle 8 in a fixed vertical position with respect to the truck wheels 7, while the brake cylinder devices 16 and non-rotatable brake elements 17 are supported by the bars 15 and 18. It should be further noted that the inside diameters of the brake cylinder devices and non-rotatable elements, indicated by the reference numerals 24 are considerably larger than that of tube 12 so that said devices and elements in no way contact said tube for support.

According to the invention, the assembly of support bars 15 and 18, and brake cylinder devices and non-rotatable brake elements carried by said bars, are resiliently supported in substantial coaxial relation with the rotatable brake element at all times by means which will now be described.

The support bar 18 at one side of axle 8 and the associated ends of the brake cylinder devices and non-rotatable elements are rigidly connected for support to two legs 25 of a Y-shaped bracket 26 by means of bolts 27 extending through the ends of said legs and through extensions 28 of the support portions 19 of the two end brake cylinder devices. The central leg of bracket 26 is connected by a vertically extending bolt 29 to the truck transom 4 at the transverse center of the truck frame. The fit between bolt 29 and the bracket 26 is slightly loose to permit the usual vertical movement of the truck frame with respect to the truck wheels without binding occurring between said bolt and bracket.

The assembly of brake cylinder devices and the non-rotatable brake elements are thus supported at one side of axle 8 by a single pivotal connection with the truck frame while at the opposite side of said axle said assembly is adapted to be supported from both ends of the bar 15 by means which will now be described.

Each end of the bar 15 is provided with an extended journal portion 30 bearing in a suitable bore provided in one end of a crank arm 31. The other end of each crank arm is secured to one end of a rock shaft 32, the connection between said shaft and arm being such as to turn said arm with said shaft. Each of the shafts 32 is disposed beyond one side of a wheel 7 substantially on the horizontal center line thereof and extends from the space between the wheels where it is connected to the crank arm 31 to beyond the outer face of said wheel. Each shaft 32 is supported in this location in spaced bearings 33 one of which is provided in the inner side wall of the adjacent truck side frame 2 while the other is provided in a bracket 34 projecting from the end member 3.

Each of the rock shafts 32 preferably terminates in the space between the side walls of the side frame 2 and therein there is provided a crank arm 35 one end of which is secured to said shaft for effecting rocking thereof. The crank arm 35 may be the same as the crank arm 31 and extends parallel thereto from the same side of the rock shaft 32. The other end of each crank arm 35 is connected by a pin 37 to one end of a link 38 the other end of which is connected by a pin 39 to one end of a lever 40. The lever 40 at each side of the truck extends through the space between the side walls of the side frame 2 over the journal box 6 and the end of the equalizer bar 10 and has its opposite end pivotally connected by a pin 41 to said side frame, said pin extending through the two walls thereof. Substantially midway between its ends each lever 40 is pivotally connected by a pin 42 to any suitable unsprung part of the vehicle truck such as a pair of spaced brackets 43 projecting upwardly from the end of equalizer bar 10.

Since the two levers 40 at the opposite sides of the truck are connected at one end to the side frames 2 and intermediate their ends to the equalizer bars 10 it will be noted that said levers through the medium of links 38, crank arms 35, rock shafts 32, and crank arms 31 act to support the support bar 15 and thereby the brake mechanism at that side of the axle 8. The non-rotatable parts of the brake mechanism including, in the example, the bars 18 and 15, the non-rotatable brake elements and the brake cylinder devices are thus supported at one side of the axle by the single connection through pin 29 directly with the truck frame and at the other side of the axle through the two connections including the rock shafts 32 and levers 40.

At one side of the axle 8 the non-rotatable parts of the brake mechanism are thus resiliently supported with the truck frame from the unsprung parts of the truck, while at the opposite side of the axle said parts of the brake mechanism are supported in a sprung condition through the medium of the connection between the levers 40 and the truck frame. By thus resiliently supporting the non-rotatable parts of the brake mechanism damage thereto incident to shock to which the wheels 7 may be subjected is minimized.

As will be seen from Fig. 2 the truck frame 1 is capable of vertical movement relative to the truck wheels 7 in the usual manner and due to the supporting springs 11 said frame will therefore at different times occupy various elevated positions with respect to said wheels depending upon the degree of load carried by the vehicle and resting on the truck frame. In Fig. 2 the truck frame 1 is shown in the position with respect to wheels 7 which it may occupy when the vehicle body supported thereon is in a substantially semi-loaded condition, said position being substantially midway between the uppermost and lowermost positions which it will occupy when said vehicle body is empty and fully loaded, respectively.

The parts of the brake mechanism and the support means therefore are preferably so arranged that in this semi-loaded position of the truck frame the levers 40 and the crank arms 31 and 35 will be extending in a substantially horizontal direction with the longitudinal center lines of said crank arms disposed in a horizontal plane including the axis of axle 8 and of the various annular parts of the brake mechanism.

Operation

If the load on the truck frame 1 should be decreased the springs 11 will act to raise said frame away from the truck wheels 7 and in so doing will raise the connected end of bracket 26 supporting the brake mechanism at one side of the axle and at the same time rock the levers 40 about their pivotal connections with the equalizer bars 10 in a clockwise direction. This rocking of the levers 40 acts to lower the links 38 and thereby permit through the medium of the crank arms 35, rock shafts 32 and crank arms 31 a lowering of the support bar 15. The side of the brake mechanism connected through the bracket 26 to the truck frame is thus elevated upon upward movement of the truck frame, while the opposite side of the brake mechanism supported by the bar 15 is lowered and the parts are so arranged that the extent which one side of the brake mechanism is raised equals substantially the extent of downward movement of the opposite side of the brake mechanism. Thus upon upward movement of the truck frame with respect to the wheels 7, the brake mechanism is in effect turned about its axis and remains substantially in coaxial relation with the rotatable braking elements secured to the truck wheels 7.

Now in case the load carried by the truck frame is increased the truck frame is moved downwardly against the supporting springs 11 and in so moving lowers the connected end of bracket 26 and thereby the associated side of the assembly of non-rotatable parts of the brake mechanism. As the truck frame is thus moved down it acts to rock the levers 40 in a counterclockwise direction and such rocking is transmitted through the crank arms 35 and 31 to the support bar 15 and acts to elevate said bar an amount substantially equal to the degree of downward movement of the supporting bar 18 at the opposite side of the axle. Thus, as in the case of upward movement of the truck frame 1, the assembly of non-rotatable parts of the brake mechanism is, upon downward movement of the truck frame, in effect rotated about its axis and therefore remains substantially in coaxial relation with the rotatable parts of the brake mechanism and thereby with the truck wheels 7. This coaxial relationship between the assemblage of non-rotatable brake elements and the rotatable brake elements will be substantially maintained regardless of the vertical position which the truck frame 1 may assume with respect to wheels 7 as governed by the loaded condition thereof.

It will be apparent that changes in angularity of the crank arms 31 and 35 which occur during movement of the truck frame to various elevated positions will tend to effect movement of the assemblage of non-rotatable parts of the brake mechanism out of coaxial relation with the rotatable parts thereof but if this should occur in use it will be immaterial due to the very limited extent thereof. The fit between parts such as the crank arms 31 and 35, the rock shaft 32, links 38 and levers 40 is in this type of apparatus usually relatively free and sufficient to offset the tendency just described. The relatively free fit between parts just mentioned along with the slightly loose connection between the bracket 26 and support pin 29 will also permit the desired positioning of the assemblage of non-rotatable parts of the brake mechanism upon movement of the truck frame with respect to the wheels without binding or distortion of any of said parts.

The line diagram shown in Fig. 3 illustrates diagrammatically the manner in which the support arrangements for the non-rotatable parts of the brake mechanism acts upon vertical movement of the truck frame with respect to the truck wheels to maintain said non-rotatable parts in substantial coaxial relation with the rotatable parts, as above described.

In this diagram in which lines and circles are employed to illustrate various parts of the supporting arrangement shown in Figs. 1 and 2, the same reference numerals are employed as were employed for the corresponding parts in the above description.

In the diagram the solid lines 40, 38, and 35 indicate the respective positions which the levers 40, links 38 and crank arms 35 (and crank arms 31 to the rear of the arms 35 and therefore not seen in the diagram) occupy when the truck frame is in a semi-loaded condition, it being noted that the levers 40 and the crank arms 35 are shown arranged parallel to each other and extending horizontally. It will also be noted that the line indicating the crank arm 35 is shown in line with an extension of the center-line of the brake mechanism indicated by reference numeral 45 which center-line also is arranged in a horizontal plane. This represents the condition which all of the corresponding parts of the brake mechanism shown in Figs. 1 and 2 may occupy with the vehicle in a semi-loaded condition.

Let it be assumed that the load on the truck frame 1 is increased and moves said frame in the direction of the truck wheels 7 a distance such as indicated in Fig. 3 by reference numerals 46. Upon this downward movement the connection between bracket 26 and the truck frame will be lowered as will also the rock shafts 32, and at the same time the levers 40 will be turned in a counterclockwise direction and rock the crank arms 35 and 31 and thus raise the connected side of the assemblage of non-rotatable parts of the brake mechanism.

The various parts of the support arrangement for the non-rotatable parts of the brake mechanism and the horizontal center-line 45 thereof will under this new condition occupy the positions shown in dotted lines in Fig. 3, it being noted that the dotted line 45 indicating the center-line of the assemblage of non-rotatable parts still substantially intersects the axis of axle 8 designated by reference numeral 47. Thus the non-rotatable parts of the brake mechanism are in substantially the same relation to the rotatable parts of the brake mechanism in this lower position of the truck frame as existed in the semi-loaded condition.

The positions which the various support elements for the non-rotatable parts of the brake mechanism will occupy with the truck frame elevated above the position shown in full lines in Fig. 3 will be readily apparent from the above description and from the diagram shown in Fig. 3 and it will also be apparent that in this elevated position the non-rotatable parts of the brake mechanism will still be in substantial coaxial relation with the rotatable parts thereof.

Since the non-rotatable parts of the brake mechanism thus at all times remain in substantial coaxial relation with the rotatable parts of the mechanism it will be apparent that vertical movement of the truck frame has no effect upon the size of the non-rotatable brake elements so that said elements need be of no greater size than in the structure disclosed in the McCune patent hereinbefore referred to, notwithstanding the fact that the present structure is resiliently supported from the truck frame in contrast to the McCune structure wherein all parts are carried directly on the wheel and axle assembly.

It is desired to point out that since the crank arms 31 and 35 are of the same length their connections with the support rod 15 at one side of the wheels 7 and with the pins 37 at the opposite side are movable in unison and to the same degree. These arms and the rock shafts 32 thus permit the use of relatively short levers 40, that is, levers of a length less than the diameters of wheels 7 and provides for connecting such short levers around the wheels 7 to the support bar 15 which is spaced from the axis of the wheel and axle assembly a distance less than the radius of wheels 7.

*Summary*

From the above description of one embodiment of the invention it will be apparent that I have provided a relatively simple arrangement for at all times supporting the non-rotatable parts of a brake mechanism from a vertically movable truck frame in substantial coaxial relation with the axle of the truck. The resilient support for the non-rotatable parts of the brake mechanism is adapted to minimize wear and damage to said elements due to vibration of the truck wheels on the track rails and since the improved supporting arrangement will under all operating conditions of the truck maintain the non-rotatable parts of the brake mechanism in substantial coaxial relation with the rotatable parts of the brake mechanism the size of said non-rotatable parts is substantially independent of vertical movement of the truck frame with respect to the truck wheels.

While one illustrative embodiment of the invention has been described in detail it is not the intention to limit the scope of this embodiment or otherwise than by the terms of the appended claims.

Having now described my invention, what I claim as new and desire to secure by Letters Patent, is:

1. In a vehicle brake mechanism in combination, a wheel and axle assembly to be braked, a truck frame carried by said assembly and capable of vertical movement relative thereto, an annular rotatable friction brake element secured to rotate with said assembly in coaxial relation therewith, a non-rotatable friction brake element having a braking surface disposed substantially in coaxial relation with said rotatable element and adapted to frictionally engage said rotatable element for braking said assembly, and a supporting structure for said non-rotatable element including a lever having a fulcrum connection at one end with said frame and having another fulcrum connection midway between its ends with said assembly and operatively connected at its opposite end to said non-rotatable element for effecting movement of said non-rotatable element in a direction opposite to and to the same extent as the vertical movement of said truck frame to thereby compensate for such movement of said truck frame and maintain at all times said relation between said surface and rotatable brake element.

2. In a vehicle brake in combination, a wheel and axle assembly to be braked, a truck frame carried by said assembly and adapted to move vertically relative thereto, an annular rotatable friction brake element secured to rotate with said assembly in coaxial relation therewith, a non-rotatable friction brake element having a braking surface disposed substantially in coaxial relation with said rotatable element and adapted to frictionally engage said rotatable element for braking said assembly, and a supporting structure for said non-rotatable element including means having a rockable fulcrum connection with said frame at one side of the axle of said wheel and axle assembly and having at the opposite side of said axle fulcrum connection with said frame and also having a fulcrum connection with said wheel and axle assembly, said structure being operative to maintain said surface in said relation to said rotatable element in all vertical positions of said frame with respect to said assembly.

3. In a vehicle brake in combination, a wheel and axle assembly to be braked, a truck frame carried by said assembly and capable of vertical movement relative thereto, an annular rotatable friction brake element disposed between the wheels of said assembly and encircling the axle of said assembly and secured to rotate with said assembly in coaxial relation therewith, a non-rotatable friction brake element having a braking surface disposed in coaxial relation with said rotatable brake element and adapted to frictionally engage said rotatable element for braking said assembly, and support means including a lever disposed beyond the outside face of one of said wheels and having one fulcrum connection with said frame and another fulcrum connection with said assembly and being rockable by said frame upon vertical movement of said frame with respect to said assembly, and means connecting said lever at one side of said wheel to the non-rotatable element at the opposite side of said wheel, said support means being so designed and arranged as to maintain said surface of said non-rotatable element in said coaxial relation to said rotatable element in all vertical positions of said frame with respect to said assembly.

4. In a vehicle brake in combination, a wheel and axle assembly to be braked, a truck frame carried by said assembly and capable of vertical movement relative thereto, an annular rotatable friction brake element disposed between the wheels of said assembly and encircling the axle thereof and secured to said assembly for rotation therewith in coaxial relation, a non-rotatable friction brake element having a braking surface disposed in substantial coaxial relation with said rotatable brake element and adapted to frictionally engage said rotatable element for braking said assembly, and support means for supporting said non-rotatable element in a position in which said surface is in said coaxial relation to said rotatable element including a lever disposed beyond the outer face of one of the wheels of the assembly and having a pivotal support connection midway between its ends on said assembly, said lever being of less length than the diameter of the wheels of said assembly and having at one end a pivotal connection with said frame, and means connecting the other end of said lever around said wheel to said non-rotatable element, said support means being operative to maintain said non-rotatable element in said position with said braking surface in coaxial relation with said rotatable element upon vertical movement of said frame with respect to said assembly.

5. In a vehicle brake in combination, a wheel and axle assembly to be braked, a truck frame carried by said assembly and capable of vertical movement relative thereto, an annular rotatable friction brake element disposed between the wheels of said assembly and encircling the axle of said assembly and secured to said assembly in coaxial relation therewith for rotation with said assembly, a non-rotatable friction brake element having a braking surface arranged in substantial coaxial relation with said rotatable element and adapted to frictionally engage said rotatable element for braking said assembly, and a supporting structure for said non-rotatable element having at one side of said axle a direct rockable connection with said frame and including at either end of said assembly a lever having spaced pivotal connections with said assembly and frame respectively, the two levers being so arranged as to cooperate with said direct connection with said frame upon vertical movement of said frame with respect to said assembly to maintain said surface of said non-rotatable element in substantial coaxial relation with said rotatable element in all vertical positions of said frame with respect to said assembly.

6. In a vehicle brake in combination, a wheel and axle assembly to be braked, a truck frame carried by said assembly and capable of vertical movement relative thereto, an annular rotatable friction brake element disposed between the wheels of said assembly and encircling the axle of said assembly and secured to said assembly in coaxial relation therewith for rotation with said assembly, a non-rotatable friction brake element having a braking surface arranged in substantial coaxial relation with said rotatable element and adapted to frictionally engage said rotatable element for braking said assembly, and a support structure for said non-rotatable element having at one side of the axle of said wheel and axle assembly a direct rockable connection with said truck frame and including at the opposite side of said axle a rock shaft journaled in said frame and extending from the space between the wheels of said assembly to beyond the outer face of one of said wheels, an arm secured to the inner end of said shaft and operatively connected to said structure for supporting same, an arm secured at one end to the opposite end of said shaft, and a lever disposed beyond the outer face of said one wheel and operatively connected at one end to the other end of the last named arm and at the opposite end to said truck frame and having intermediate its ends a rockable connection with said assembly, the parts of said structure being so designed and arranged as to operate upon vertical movement of said frame with respect to said assembly to at all times maintain said braking surface on said non-rotatable element in said coaxial relation with said rotatable brake element.

7. In a vehicle brake, in combination, a wheel and axle assembly to be braked, a truck frame carried by said assembly and capable of vertical movement relative thereto, an annular rotatable friction brake element encircling the axle of said assembly between the wheels thereof and secured to rotate with said assembly in coaxial relation therewith, an annular non-rotatable friction brake element disposed in coaxial relation with said rotatable brake element and adapted to be moved axially into frictional braking engagement with said rotatable brake element for braking said assembly, and a three point supporting structure for said non-rotatable element having at one side of said assembly a direct rockable support connection with said truck frame and having at the opposite side of said assembly support connections with both sides of the truck frame, the support connection with each side of said truck frame including a lever having one pivotal connection with said assembly and another pivotal connection with said frame and being operative upon vertical movement of said frame with respect to said assembly to move the connected portion of the non-rotatable brake element in a direction opposite to the direction of movement of the truck frame with respect to said assembly and to an extent sufficient to substantially compensate for the movement of the portion of the non-rotatable element having a direct connection with the truck frame.

8. In a vehicle brake in combination, a wheel and axle assembly to be braked, a truck frame carried by said assembly and capable of vertical movement relative thereto, a plurality of annular rotatable friction brake elements encircling the axle of said assembly between the wheels thereof and secured to rotate with said wheels in coaxial relation therewith, a non-rotatable friction brake element for each of said rotatable brake elements having a braking surface disposed substantially in coaxial relation with the respective rotatable brake element and adapted upon axial movement to frictionally engage said rotatable element for braking said assembly, and a structure for at all times supporting said non-rotatable elements with the braking surfaces thereof in coaxial relation with said rotatable brake elements, said structure having at one side of said assembly and midway between the sides of the truck frame a direct rockable connection with said frame, and means connected to said structure adjacent the end-most rotatable brake elements at the opposite sides of said assembly operative to support and vary the vertical position of the connected portion of said non-rotatable brake elements to compensate for movement of the portion of said non-rotatable brake elements at the opposite side of said assembly upon vertical movement of said truck frame, said means including at either side of said truck a lever having at one end a pivotal connection with said frame and at the other end a pivotal connection with said structure and intermediate its ends a pivotal support connection with said wheel and axle assembly.

9. In a vehicle brake in combination, a wheel and axle assembly to be braked, a truck frame carried by said assembly and capable of vertical movement relative thereto, an annular rotatable friction brake element and an annular non-rotatable friction brake element, said brake elements encircling the axle of said assembly between the wheels thereof and being operable upon axial movement into frictional interengagement to effect braking of said assembly, means securing said rotatable brake element to said assembly in coaxial relation and for rotation therewith, a structure at either side of said axle carrying said non-rotatable brake element, means connecting the structure at one side of said axle directly to said truck frame intermediate the sides thereof for supporting said non-rotatable brake element at that side of said axle, and means supporting said non-rotatable brake element at the opposite side of said axle comprising at either side of said truck frame a lever connected at one end to said structure at said opposite side of said assembly and connected at the opposite end to the truck frame and having intermediate its ends a rockable connection with said assembly, the two levers being so designed and arranged as to cooperate with the said direct connection between said structure and frame to maintain said non-rotatable brake element in coaxial relation with said rotatable brake element upon vertical movement of said truck frame with respect to said assembly.

10. In a vehicle brake in combination, a wheel and axle assembly to be braked, a truck frame carried by said assembly and capable of vertical movement relative thereto, and a disk brake mechanism for braking said assembly comprising a plurality of interleaved rotatable and non-rotatable annular friction brake elements and annular brake cylinder means disposed between the wheels of said assembly and encircling the axle thereof in coaxial relation with said assembly, said brake cylinder means being operative by fluid under pressure to effect movement of said non-rotatable elements into frictional engagement with said rotatable brake elements for braking said assembly, means securing said rotatable brake elements to said assembly in coaxial relation and for rotation therewith, a bar at either side of said assembly carrying said non-rotatable brake elements and brake cylinder means, means at one side of said assembly having a rockable connection with said frame midway between the sides thereof and connected to the bar at that side of said assembly for supporting same, and means for supporting the bar at the opposite side of said assembly including at each side of said frame a lever having at one end a support connection with the adjacent end of the bar at that side of said assembly and at the opposite end a pivotal connection with said truck frame and having intermediate its end a rockable connection with said assembly, the last named means including the lever at either side of the truck frame being so designed and arranged as to vary the vertical position of the connected bar upon vertical movement of the truck frame with respect to said assembly to compensate for vertical movement of the other bar upon vertical movement of said truck frame for thereby maintaining said non-rotatable brake elements and brake cylinder means in substantial coaxial relation with said rotatable brake elements.

CLYDE C. FARMER.